United States Patent [19]

Sikora

[11] Patent Number: 5,060,131
[45] Date of Patent: Oct. 22, 1991

[54] DC TO DC CONVERTER POWER SUPPLY WITH FEEDBACK CONTROLLED CONSTANT CURRENT OUTPUT

[75] Inventor: Scott T. Sikora, Mesa, Ariz.

[73] Assignee: Tomar Electronics, Inc., Gilbert, Ariz.

[21] Appl. No.: 530,632

[22] Filed: May 29, 1990

[51] Int. Cl.$^5$ .......................................... H02M 3/335
[52] U.S. Cl. ...................................... 363/97; 363/21; 363/56
[58] Field of Search ..................... 363/20, 21, 97, 131, 363/56; 323/266, 282, 285

[56] References Cited

U.S. PATENT DOCUMENTS

| | | | |
|---|---|---|---|
| 4,092,710 | 5/1978 | Wadsworth | 363/19 |
| 4,538,073 | 8/1985 | Freige et al. | 363/17 |
| 4,672,518 | 6/1987 | Murdock | 363/21 |
| 4,682,081 | 7/1987 | Sikora | 315/219 |
| 4,704,670 | 11/1987 | Gradl et al. | 363/21 |
| 4,755,723 | 7/1988 | Sikora | 315/219 |
| 4,866,588 | 9/1989 | Rene | 363/21 |
| 4,881,023 | 11/1989 | Perusse et al. | 323/266 |
| 4,885,674 | 12/1989 | Varga et al. | 363/21 |

Primary Examiner—Peter S. Wong
Attorney, Agent, or Firm—Cahill, Sutton & Thomas

[57] ABSTRACT

A power supply includes a coupled inductor having a primary winding, a secondary winding and a feedback winding. A rectifier/filter is coupled to the secondary winding for supplying the load with a DC current. A power switch is coupled in series with the primary winding for switching between conductive and non-conductive states to control the flow of current through the primary winding. A first drive circuit applies a first drive signal to the control lead of the power switch for switching the power switch into the conductive state. A primary current sense circuit generates a primary current feedback signal representative of the primary winding current. An output current sense circuit generates an output current feedback signal representative of the power supply output current. A programmable reference voltage generator generates a DC reference voltage having a magnitude determined by the output current feedback signal. A power switch control circuit compares the primary current feedback signal with the DC reference voltage and removes the first drive signal from the power switch control lead when the primary current feedback signals reaches a predetermined level to switch the power switch into the non-conductive state. A second drive circuit applies a second drive signal to the control lead of the power switch to maintain the power switch in the non-conductive state while energy is being transferred into the rectifier/filter.

37 Claims, 11 Drawing Sheets

PROTECT MODE OPERATION

FIG. 12A PROTECT MODE OPERATION

FIG. 12B

DC TO DC CONVERTER POWER SUPPLY WITH FEEDBACK CONTROLLED CONSTANT CURRENT OUTPUT

SUMMARY OF THE INVENTION

It is therefore a primary object of the present invention to provide a power supply for delivering a constant output current to a load which utilizes a programmable reference voltage generator coupled to a voltage input terminal of a comparator for varying the magnitude of the reference voltage in response to variations in the power supply output current to control the amount of energy transferred by a DC to DC converter power supply to its load during each "on" cycle of the converter power switch.

Another object of the present invention is to provide a power supply for delivering a constant output current to a load which utilizes a power switch control circuit in the form of a synthetic thyristor operating as a voltage comparator which compares a variable reference voltage with a feedback signal representative of the transformer primary winding current to limit the peak primary current and the duration of each primary winding current pulse during each operating cycle of the DC to DC converter.

Another object of the present invention is to provide a power supply for delivering a constant output current to a load which utilizes a programmable reference voltage generator having a current controlled resistor operating within a current controlled divider to vary the reference voltage coupled to an input terminal of a voltage comparator in response to a feedback signal representative of the output current to the load.

Another object of the present invention is to provide a power supply for delivering a constant output current to a load which utilizes a bipolar transistor coupled to operate as a current controlled resistor within a current controlled voltage divider.

Another object of the present invention is to provide a power supply for delivering a constant output current to a load which includes an output voltage threshold monitor for detecting whether the power supply is generating an output into a normal, "safe" load or into an abnormal, "unsafe" load.

Another object of the present invention is to provide a power supply for delivering a constant output current to a load further including an output current sense circuit having a mode switch operable between normal and protect mode configurations and responsive to the output signal from an output voltage threshold monitor for inserting an offset voltage of a predetermined magnitude in the current feedback circuit for limiting the power supply output current when the load represents an unsafe load.

Briefly stated, and in accord with one embodiment of the invention, a power supply for delivering a constant output current to a load includes a coupled inductor having a primary winding, a secondary winding and a feedback winding. Rectifier/filter means is coupled to the transformer secondary winding for supplying the load with a DC current. A power switch having a control lead and a first and second switching leads is coupled in series with the transformer primary winding for switching between conductive and non-conductive states to control the flow of current through the primary winding. First drive means applies a first drive signal to the control lead of the power switch to switch the power switch into the conductive state. Primary current sense means is coupled to measure the flow of current through the primary winding and to generate a primary current feedback signal. Output current sense means is coupled to monitor the current flow through the load and to generate an output current feedback signal representative of the power supply output current magnitude. A programmable reference voltage generator generates a DC reference voltage having a magnitude determined by the output current feedback signal. Power switch control means compares the primary current feedback signal with the DC reference voltage and removes the first drive signal from the power switch control lead when the primary current feedback signal reaches a predetermined level relative to the DC reference voltage to switch the power switch into the non-conductive state. Second drive means includes the transformer feedback winding and applies the second drive signal to the control lead of the power switch to maintain the power switch in the non-conductive state while energy is being transferred from the secondary winding into the rectifier/filter means.

DESCRIPTION OF THE DRAWINGS

The invention is pointed out with particularity in the appended claims. However, other objects and advantages together with the operation of the invention may be better understood by reference to the following detailed description taken in connection with the following illustrations, wherein:

DESCRIPTION OF THE PREFERRED EMBODIMENT

In order to better illustrate the advantages of the invention and its contributions to the art, a preferred hardware embodiment of the invention will now be described in some detail.

Figure 1:
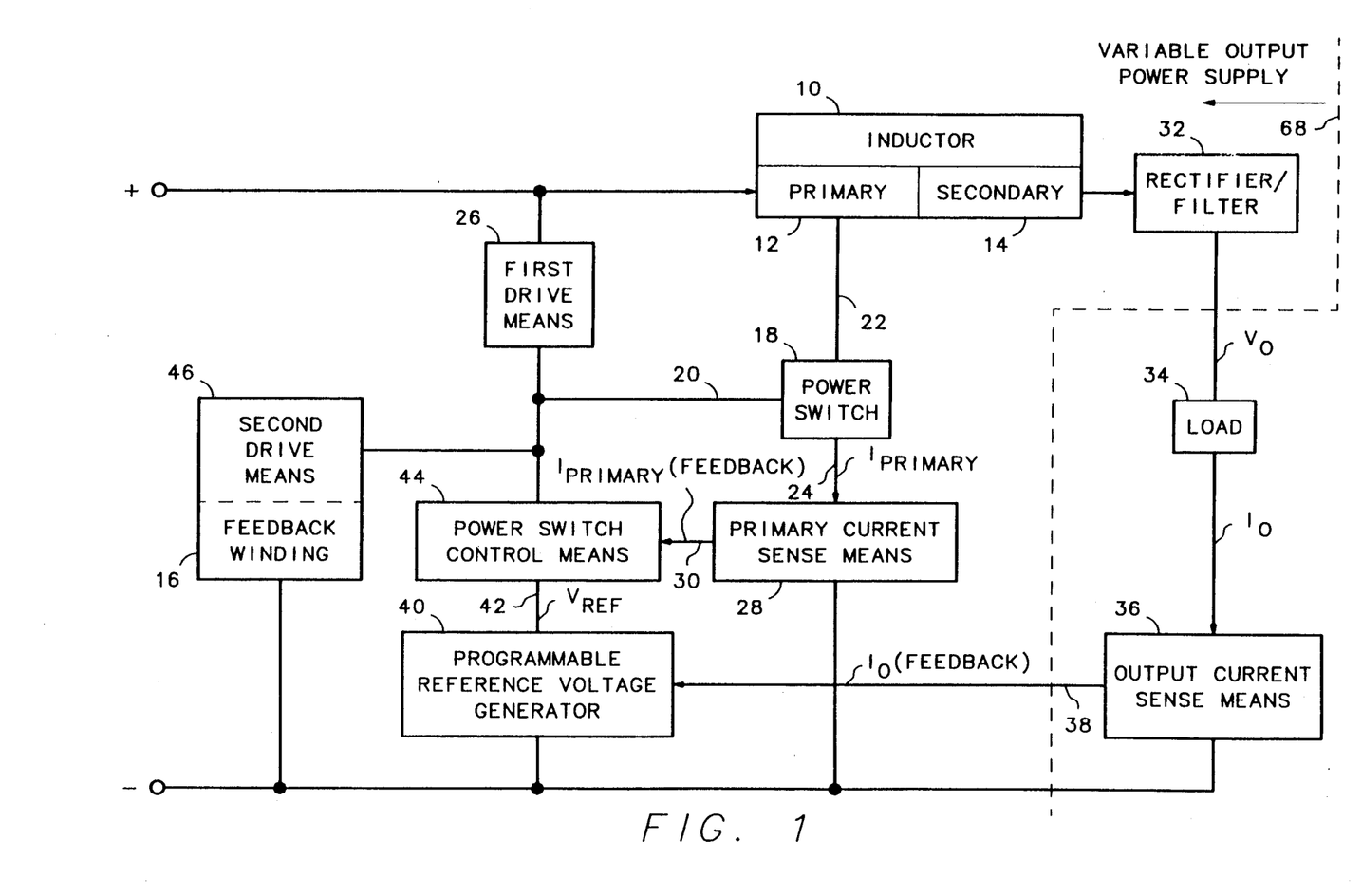
FIG. 1 represents a generalized block diagram representative of one embodiment of the constant current power supply of the present invention.
Figure 2A:
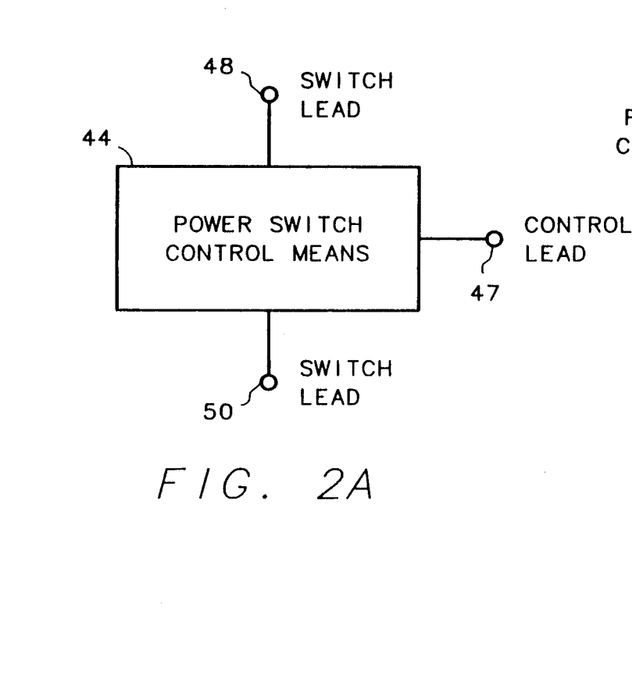
FIG. 2A represents a block diagram of the power switch control means illustrated in FIG. 1, particularly identifying the control and switch leads of that device.
Figure 2B:
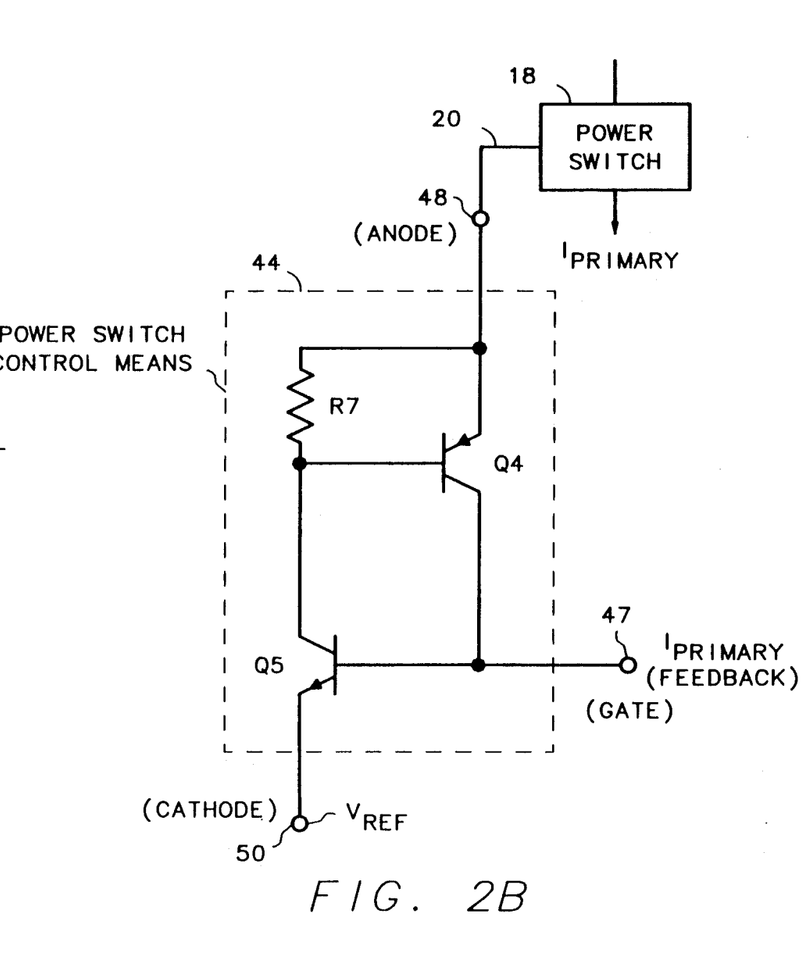
FIG. 2B represents a more detailed schematic level diagram of one possible configuration of the internal operating elements of the power switch control means illustrated in FIG. 2A.

Referring now to FIGS. 1, 2 and 3, the constant current power supply of the present invention includes a coupled inductor or transformer 10 having a primary winding 12, a secondary winding 14 and a feedback winding 16. A power switch 18 includes a control lead 20 as well as first and second switching leads 22 and 24 coupled in series with primary winding 12 for switching between conductive and non-conductive states to control the flow of current through primary winding 12. First drive means 26 applies a first drive signal to control lead 20 of power switch 18 for initially switching the power switch into the conductive state. Primary current sense means 28 is coupled to measure the flow of current through primary winding 12 and to generate a primary current feedback signal on output lead 30.

Rectifier filter means 32 converts the high voltage DC output pulses from transformer secondary winding 14 into a high voltage DC output current which is directed to a load 34. In the preferred embodiment of the invention, load 34 represents a laser tube which requires an eight thousand volt startup voltage and which maintains a voltage drop of approximately one thousand volts during steady state operation.

Output current sense means 36 is coupled to monitor the current flow through load 34 and to generate an output current feedback signal on output lead 38.

Programmable reference voltage generator 40 generates a DC reference voltage ($V_{ref}$) on output lead 42 where the magnitude of $V_{ref}$ is determined by the output current feedback signal on feedback lead 38.

Power switch control means 44 functions as a two input lead voltage comparator and compares the primary current feedback signal on output lead 30 with $V_{ref}$ on lead 42 and shunts to ground the first drive signal generated by first drive means 26 from power switch control lead 20 when the primary current feedback signal reaches a predetermined level relative to $V_{ref}$ to switch the power switch into the non-conductive state.

Second drive means 46 includes transformer feedback winding 16 and applies a second drive signal to control lead 20 of power switch 18 to maintain the power switch in the non-conductive state while energy is being transferred from secondary winding 14 into rectifier/filter means 32.

Referring now to FIGS. 1, 2, 3 and 6, the operation of power switch 18, primary current sense means 28 and power switch control means 44 will be described in greater detail.

Figure 6:
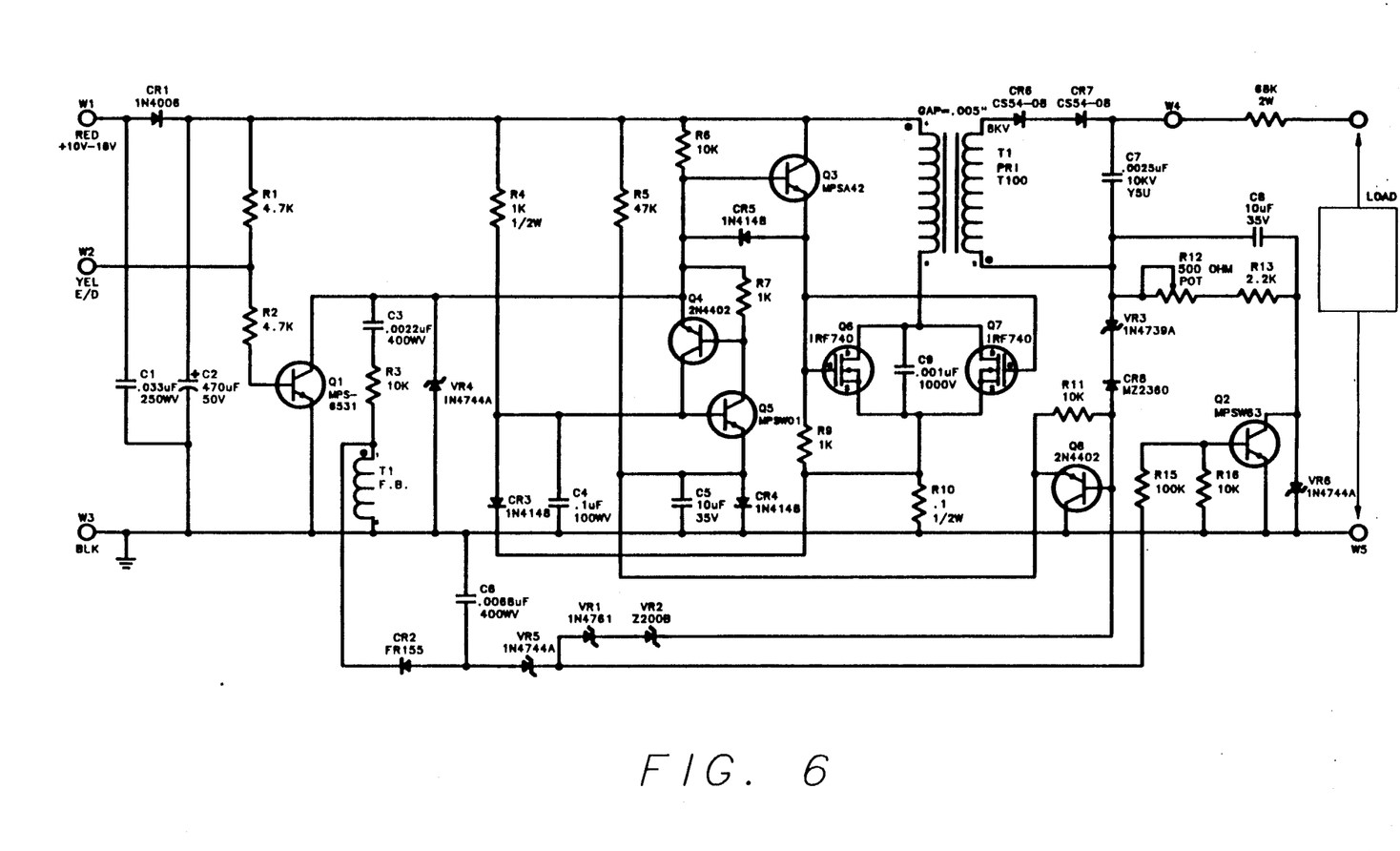
FIG. 6 represents a detailed schematic level diagram of one preferred embodiment of the present invention.

The preferred embodiment of power switch 18 illustrated in the FIG. 6 schematic represents a pair of parallel connected field effect transistors (FET's) Q6 and Q7. Q6 and Q7 are coupled to switch "on" and "off" to thereby control the flow of current through transformer primary winding 12. The magnitude of the peak current level flowing through primary winding 12 is designated $I_{peak}$ and illustrated in the FIG. 3A timing diagram.

Primary current sense means 2 is inserted in series with the flow of current from primary winding 12 through power switch 18 to ground. In the preferred embodiment of the invention, 0.1 Ohm resistor R10 is inserted in series with the flow of current through power switch 18 to generate a voltage representative of the primary current magnitude. Resistor R4, diode CR3 and capacitor C4 also form a part of primary current sense means 28. Output lead 30 of primary current sense means 28 couples the primary current feedback signal generated by primary current sense means 28 to the control lead of power switch control means 44 as identified in FIG. 2A. FIG. 2B illustrates a complete schematic diagram of power switch control means 44 which has been excerpted from the more complete schematic diagram of FIG. 6.

FIG. 2B illustrates that power switch control means 44 is configured to operate as a synthetic thyristor where the thyristor gate terminal corresponds to the control lead of power switch control means 44. A first switch lead 48 corresponds to the thyristor anode terminal and is coupled to the control lead 20 of power switch 18. The second switch lead 50 corresponds to the thyristor cathode and is coupled to the output lead 42 of programmable reference voltage generator 40 on which the DC reference voltage $V_{ref}$ is generated.

Since the DC to DC converter power supply of the present invention operates at frequencies on the order of 150KHz in its normal mode of operation and at a higher frequency on the order of 1MHz in a protect mode of operation which will be described below, it is important to provide power switch control means 44 with a maximum operating frequency response of at least about 1MHz. Since a conventional three terminal thyristor is limited to a maximum operating frequency on the order of 60Hz, such a single element component would not function in the present circuit.

Power switch control means 44 functions both as a high speed voltage comparator and as a high speed switch. As illustrated by the FIG. 3D timing diagram, power switch control means 44 is normally maintained in an "off" state. When the primary current feedback signal imposed by primary current sense means 28 on the gate or control lead 47 of power switch control means 44 reaches a level equal to $V_{ref}$ plus 0.7 volts power switch control means 44 determines that the voltages on terminals 47 and 50 have achieved a proper "compare" state and nearly instantaneously actuates power switch control means 44 into the "on" state as illustrated in FIG. 3D.

Upon being toggled into the "on" state, power switch control means 44 essentially assumes the configuration of a short circuit between switch leads 48 and 50 and shunts the output of first drive means 26 and the stored voltage in the FET gate capacitance to ground through programmable reference voltage generator 40. As soon as the FET gate voltage drops below approximately two to three volts, FET's Q6 and Q7 of power switch 18 quickly turn "off," commencing the discharge of energy from transformer secondary winding 14 into filter/rectifier 32.

The "on" to "off" transition of power switch 18 also induces a voltage on feedback winding 16 which is wound with a reverse polarity relative to secondary winding 14 such that feedback winding 16 provides a negative polarity operating voltage within secondary drive means 46. Second drive means 46 therefore generates an output in the form of a negative-going, square wave as illustrated in FIG. 3C. The transfer of this negative level second drive signal from second drive means 46 to control lead 20 of power switch 18 serves to maintain power switch 18 in the non-conductive state during the time interval that feedback winding 16 continues to generate an output voltage as energy is being transferred from secondary winding 14 into rectifier/filter 32.

The continuing transfer of energy from secondary winding 14 into rectifier/filter 32 ultimately results in the depletion of the stored energy within secondary winding 14 and the collapse of both the secondary winding voltage and the feedback winding voltage. This timing point is designated in FIG. 3 by reference arrow 52. At the point designated by reference arrow 52, the second drive signal returns to a near zero, slightly positive level, while the first drive signal generated by first drive means 26 resumes a positive magnitude. In response to the positive output of first drive means 26, power switch 18 switches back into the conductive state and begins drawing current through the transformer primary winding 12.

Figure 3A:
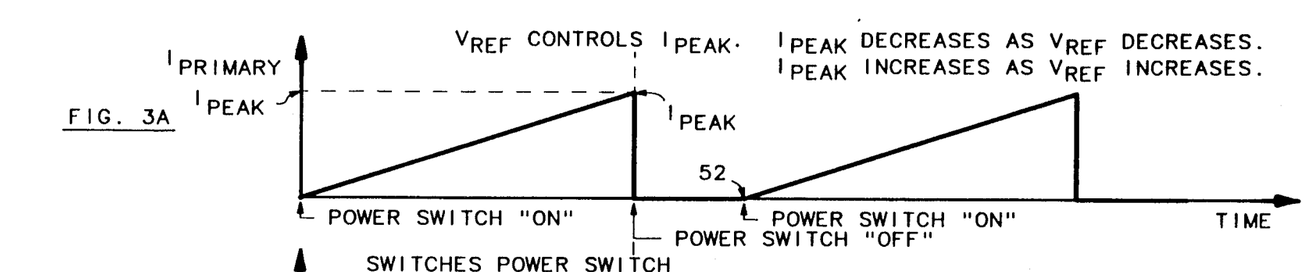
FIG. 3A, represents a timing diagram showing the cyclic variations in the transformer primary winding current levels versus time. The time axis of the FIG. 3B–3D timing diagrams are synchronized with the time axis of FIG. 3A.
Figure 3B:
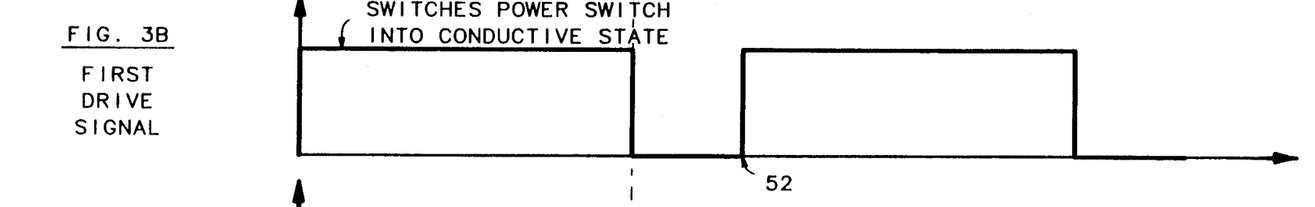
FIG. 3 represents a timing diagram illustrating variations in the first drive signal versus time.
Figure 3C:
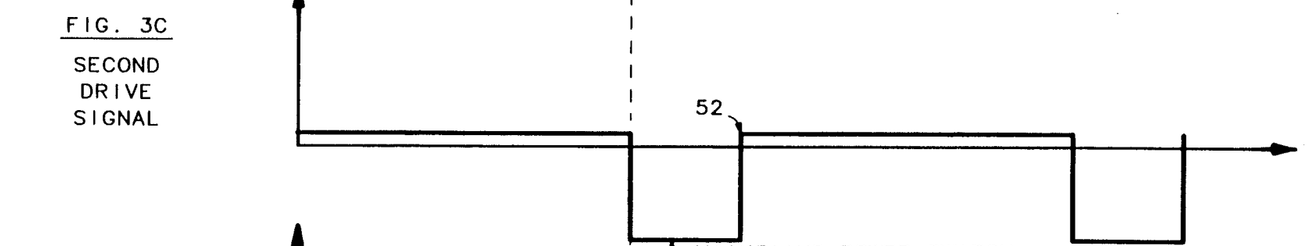
FIG. 3C represents a timing diagram depicting variations in the second drive signal versus time.
Figure 3D:
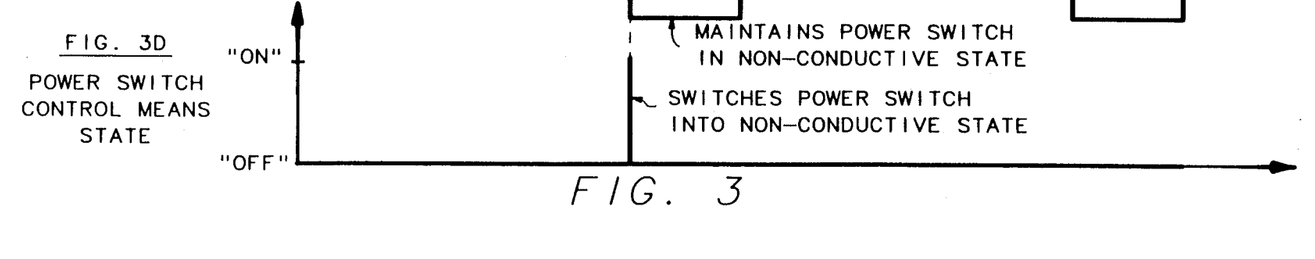
FIG. 3D is a timing diagram illustrating the manner in which the power switch control means changes state from the "off" state to the "on" state when the FIG. 3A primary current reaches the desired peak current level.

As illustrated in the FIG. 3A timing diagram, the primary current level increases from a zero level to a maximum or peak level designated as "$I_{peak}$."

Referring now to FIGS. 1, 3, 4, 5 and 6, the operation of the programmable reference voltage generator and its relationship to the other circuit elements described above will be described in detail.

Programmable reference voltage generator 40 controls the DC reference voltage or $V_{ref}$ which is transmitted to second switch lead 50 of power switch control means 44. Programmable reference voltage generator 40 serves as a feedback and control circuit which receives the output current feedback signal 38 from output current sense means 36 and generates a feedback signal in the form of the $V_{ref}$ voltage which is coupled to second switch lead 50 of power switch control means 44.

A key purpose of the present invention is to maintain the power supply output current ($I_o$) through load 34 constant within a very high tolerance regardless of variations in the impedance or resistance of load 34 itself. To achieve this objective, a feedback circuit constantly monitors the magnitude of $I_o$ and controls the "on" time of power switch 18. When $I_o$ decreases below the desired, regulated level, the "on" time of power switch 18 is increased to transfer additional energy to rectifier/filter 32 and to load 34. When $I_o$ exceeds the desired, regulated current level, the feedback circuit operates to reduce the "on" time of power switch 18. By controlling the magnitude of $I_{peak}$, the objective of either increasing or decreasing $I_o$ can be achieved with high accuracy.

As illustrated in the FIG. 3 timing diagrams, power switch control means 44 fires and turns off power switch 18 precisely at the point where the desired magnitude of $I_{peak}$ is reached.

To reduce the power supply output current $I_o$, programmable reference voltage generator 40 decreases the value of $V_{ref}$ so that power switch control means 44 generates its output signal as illustrated in timing diagram FIG. 3D earlier during the "on" state of power switch 18, resulting in a lower value of $I_{peak}$. To increase the power supply output current $I_o$, programmable reference voltage generator 40 increases the value of $V_{ref}$, causing power switch control means 44 to generate its narrow width output pulse later during the "on" cycle of power switch 18 at a time when the primary current has reached a higher $I_{peak}$ value, corresponding to the increased value of $V_{ref}$. The specific implementation of this feedback and control system will now be explained in detail.

Figures 4A, 4B:
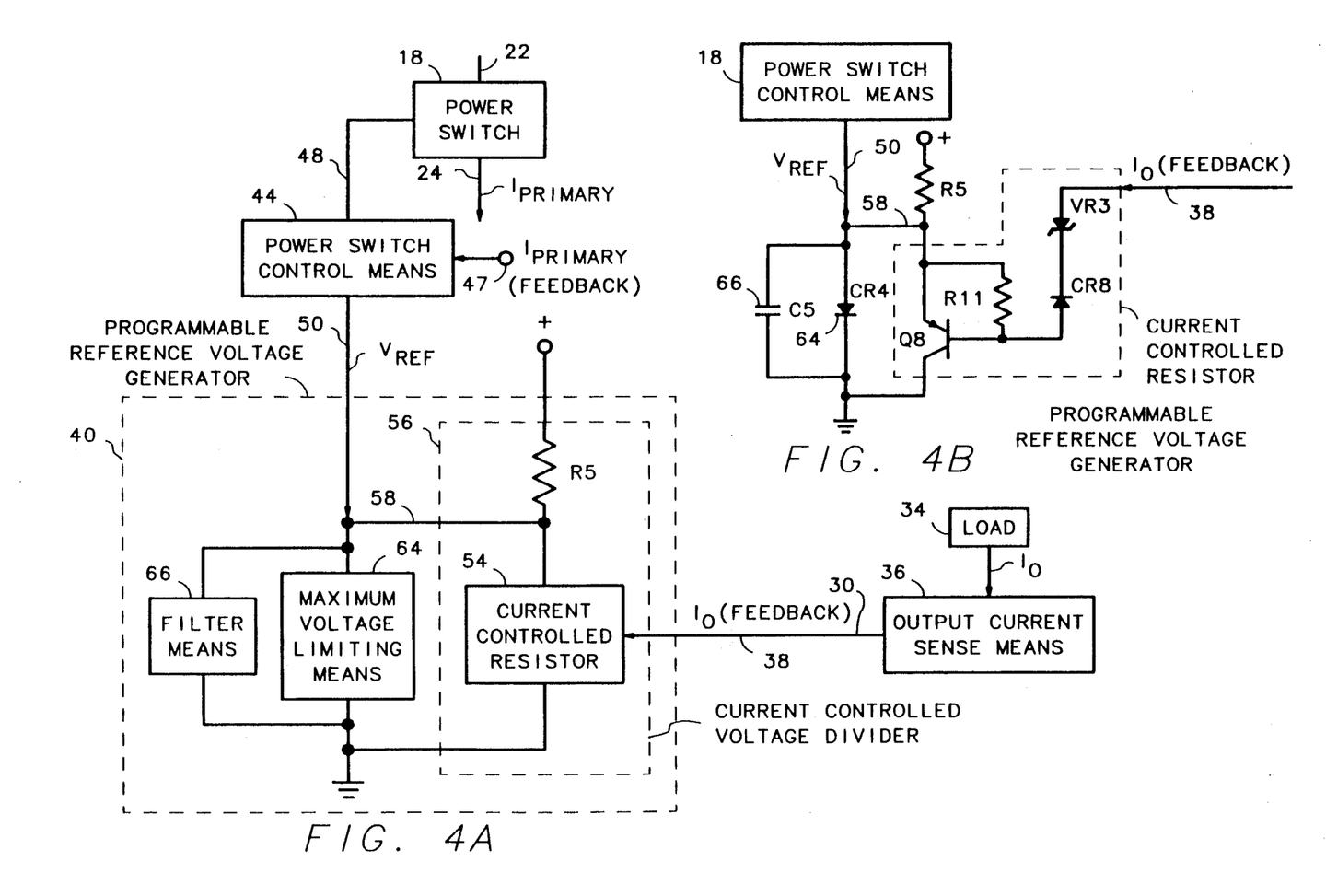
FIG. 4A represents an intermediate level block diagram of the programmable reference voltage generator illustrated in FIG. 1.
FIG. 4B represents a schematic level representation of one embodiment of the programmable reference voltage generator illustrated in FIG. 4A.

Referring now to FIGS. 4A and 4B, the individual operating elements of programmable reference voltage generator 40 will now be explained in detail. FIG. 4A represents a generalized block diagram of these circuit elements while FIG. 4B represents the specific component parts utilized in the FIG. 6 electrical schematic diagram of the preferred embodiment of the invention.

In the FIG. 6 schematic diagram, resistors R12 and R13 function as a linear output current sensor of output current sense means 36 to generate a voltage linearly related to the output current $I_o$ through load 34. This output current feedback signal 38 is transferred by output lead 30 to the input of current controlled resistor 54. Current controlled resistor 54 is coupled in series with resistor R5 which is energized by the power supply DC input voltage. Resistor R5 and current controlled resistor 54 function as a current controlled voltage divider 56 having a variable voltage output lead 58 upon which the DC reference voltage $V_{ref}$ is transmitted to second switch lead 50 of power switch control means 44.

As illustrated in FIG. 4B and correspondingly in the FIG. 6 schematic diagram, current controlled resistor 54 includes bipolar transistor Q8 having a base lead coupled in series with temperature compensating diode CR8 and zener diode VR3 which senses the magnitude of the output current feedback signal 38 generated by output current sense means 36. Transistor Q8 is biased to operate in the linear region.

When the power supply output current $I_o$ is equal to the desired or regulated current level, current controlled resistor 54 assumes an operating state within the linear region causing current controlled voltage divider 56 to generate a $V_{ref}$ output voltage on output lead 58 which causes power switch 18 to switch from the "on" state to the "off" state at a fixed primary winding current level equal to a fixed $I_{peak}$ value. This condition is illustrated by the FIG. 3A timing diagram.

If the impedance of load 34 suddenly shifts to a higher level as illustrated by reference arrow 60 in the FIG. 5A timing diagram, the power supply output current decreases below the desired, regulated output level as shown by timing diagram FIG. 5B. This reduced output current level is detected by output current sense means 36 which sends a reduced level output current feedback signal 38 to the input terminal of current controlled resistor 54 which causes a decreased current through transistor Q8, a higher voltage level on current controlled voltage divider output lead 58 and a resulting increase in the DC reference voltage $V_{ref}$ as illustrated in FIG. 5F. The increased level in $V_{ref}$ on second switch lead 50 of power switch control means 44 requires a higher level primary current feedback voltage on control lead 47 of power switch control means 44 before it will transition from its "off" state to its "on" state to switch power switch 18 from the conductive state into the non-conductive state. The requirement that the transformer primary current reach a higher level to equalize with the higher level $V_{ref}$, results in the $I_{peak}$ current being reset to a higher value and thereby maintains power switch 18 "on" for a longer period of time, thus increasing the amount of power transferred to rectifier/filter 32 and thereby increasing the power supply output current $I_o$. This series of voltage and current variations is shown by the various FIG. 5 timing diagrams for the time identified by reference arrow 60.

Figure 5A:
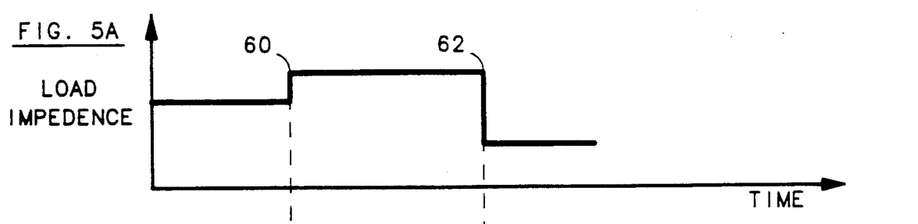
FIG. 5A represents a timing diagram showing hypothetical variations in the power supply load impedance. The time axis of the FIG. 5B–5F timing diagrams is synchronized with the time axis of FIG. 5A.
Figure 5B:
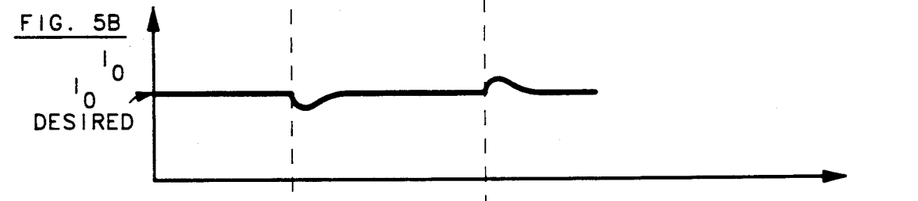
FIG. 5B represents a plot of the power supply output current $I_o$ in response to the load impedance variations illustrated in FIG. 5A.
Figure 5C:
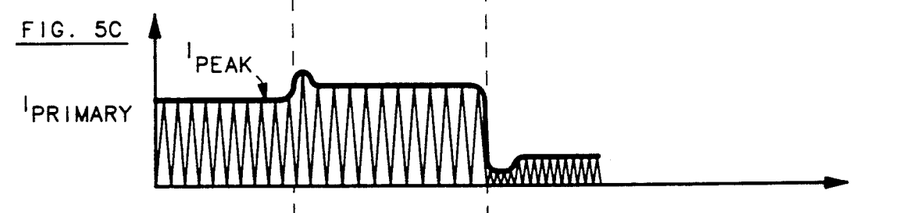
FIG. 5C represents a timing diagram of the transformer primary current $I_{primary}$ showing the manner in which the transformer primary current varies in response to variations in the load impedance.
Figure 5D:
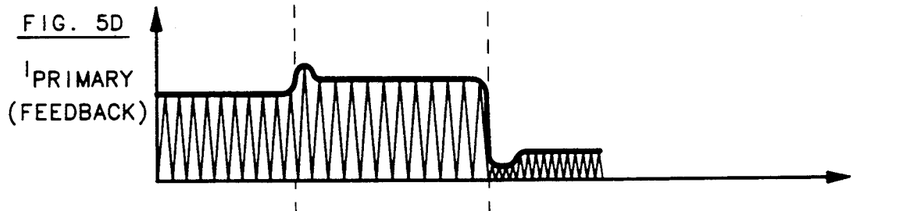
FIG. 5D is a timing diagram of the primary current feedback signal showing variations in that signal in response to variations in the load impedance.
Figure 5E:
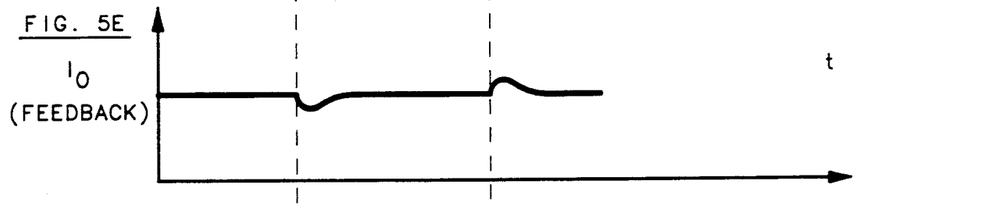
FIG. 5E is a timing diagram of the output current feedback signal showing variations in that signal in response to variations in the load impedance.
Figure 5F:
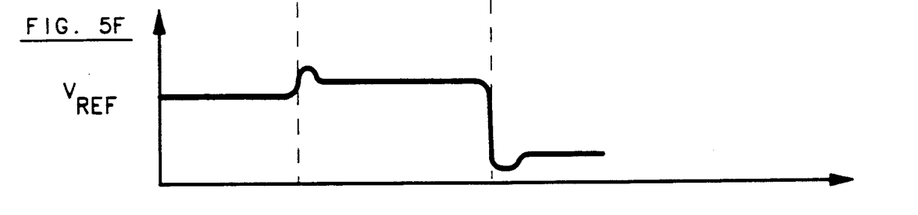
FIG. 5F is a timing diagram of the DC reference voltage $V_{ref}$ showing variations in $V_{ref}$ in response to variations in the load impedance.

Reference arrow 62 and timing diagram FIG. 5A designate the point at which the load impedance shifts from a high level to a lower level resulting in a shift in the power supply output current $I_o$ to a level greater than the desired regulated value as shown by FIG. 5B. The increased value of the output current feedback signal 38 generated by output current sense means 36 causes transistor Q8 to conduct additional current representative of a decreased resistance for current controlled resistor 54, thereby lowering the current controlled voltage divider output on output terminal 58 and deceasing the value of $V_{ref}$ communicated to second switch lead 50 of power switch control means 44. This decreased value of $V_{ref}$ causes power switch control means 44 to switch from the "off" state to the "on" state at a lower value of transformer primary current $I_{peak}$ which shortens the operating cycle of power switch 18, thereby reducing the power supply output current $I_o$ back to the desired, regulated value as illustrated in FIG. 5B.

For the time designated by reference arrow 62, the other FIG. 5 timing diagrams show the various changes in the other power supply operating parameters required to achieve this transition to new operating levels to compensate for a decrease in the value of the load impedance.

Programmable reference voltage generator 40 also includes maximum voltage limiting means 64 and filter means 66. As illustrated in the FIG. 4B simplified schematic, maximum voltage limiting means 64 corresponds to diode CR4 in the FIG. 6 schematic while filter means 66 corresponds to capacitor C5 in the FIG. 6 schematic.

Maximum voltage limiting means 64 restricts the peak value of $V_{ref}$ to a voltage on the order of about 0.7 volts to thereby limit the maximum value of the primary current to a desired maximum $I_{peak}$.

Filter means 66 functions to receive and temporarily store the current rapidly discharged from the FET gate capacitance due to the instantaneous actuation of power switch control means 44 into the "on" state. Subsequently, the current stored in filter means 66 is relatively slowly discharged through current controlled resistor 54 to thereby avoid undesirable, short term variations in $V_{ref}$.

As illustrated in FIG. 1, the various elements of the invention positioned to the left of the vertical dotted line designated by reference number 68 represent a variable output power supply which includes a feedback circuit for regulating the power supply output current $I_o$ about a fixed set point.

In the preferred embodiment of the invention, load 34 takes the form of a laser tube which requires an 8000 volt starting voltage, but which subsequently requires approximately a 1000 volt operating voltage with a constant current of on the order of about four milliamperes. Variations in various operating parameters of the laser tube will change the laser tube impedance as well as the voltage drop across the laser tube designated by $V_o$ in FIG. 1. The constant current power supply of the present invention, however, includes a fast acting feedback circuit which varies other power supply operating parameters to maintain I constant within very high tolerance levels, on the order of about plus or minus two percent.

Because humans must necessarily work with and work on systems, such as photocopy machines, in which lasers and laser power supplies have become an important part, widely recognized safety standards have been promulgated to reduce the risk to humans of improper or accidental contact with various potentially dangerous areas of lasers and laser power supplies. One of these standards is known as the VDE standard which requires that a laser power supply transition quickly into a current limit mode whenever a human accidently becomes coupled across the power supply output terminals. The VDE standards are met with the present invention as illustrated in the FIG. 6 schematic diagram and in the FIG. 8 block diagram by providing a current limiting mode of operation designated as the "protect mode" of operation.

Referring now to FIGS. 6 through 12, the operation of the current limiting mode or protect mode of the present invention will now be described in detail.

Figure 7A:
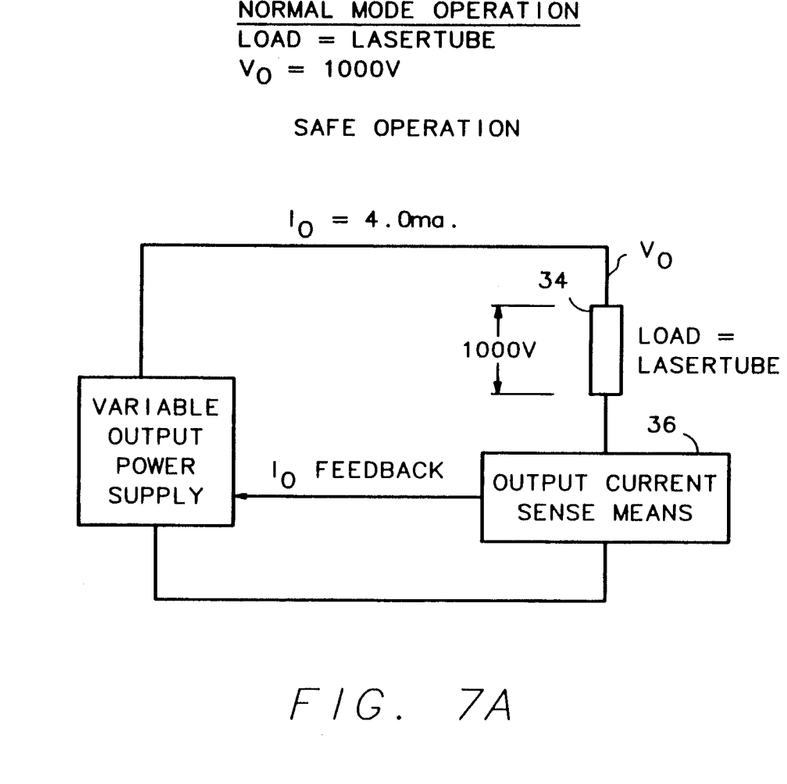
FIG. 7A represents a simplified block diagram showing a variable output power supply coupled to a normal load in the form of a laser tube depicting a safe power supply operating configuration.

FIG. 7A illustrates the variable output power supply of the present invention operating in a "normal" mode with a 1000 volt drop across a load 34 in the form of a normally operating laser tube. The operation of this power supply in the "normal" or "safe" mode of operation depicted in FIG. 7A is precisely identical to that described in connection with FIGS. 1 through 6 above.

Figure 7B:
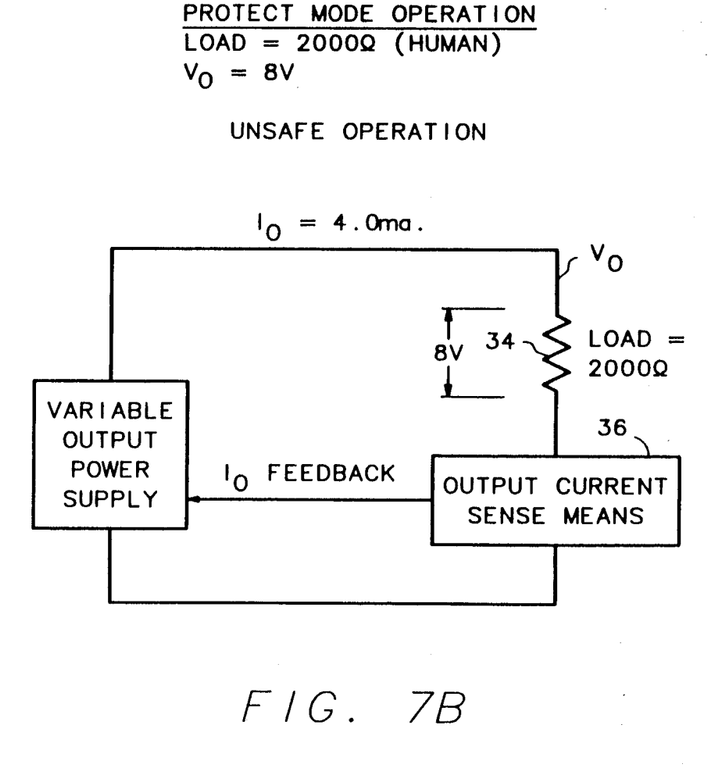
FIG. 7B represents a block diagram illustrating a variable output power supply coupled to a low impedance 2000 Ohm resistance representative of an unsafe human load.

The VDE standards equate the inadvertent and potentially dangerous coupling of a human across the laser power supply output terminals with a 2000 ohm resistive load as illustrated in 7B. Because the constant current power supply of the present invention regulates its output to achieve an output current $I_o$ equal to 4ma, the substitution of a 2000 Ohm resistor for a much higher impedance laser tube load 34 produces an output voltage V approximately equal to eight volts with a fixed output current of 4ma. Since the transfer of 4ma of current through a human can be potentially lethal, this 4ma output current level represents a highly undesirable and potentially unsafe operating mode.

Referring now to FIGS. 8, 9, 10 and 11, the output current limiting mode or protect mode of the present invention will now be described in detail. For simplicity, the elements of the invention depicted in the FIG. 1 block diagram to the left of the dotted line designated by reference arrow 68 have been designated in FIG. 8 by the block diagram designated "variable output power supply."

Figure 8:
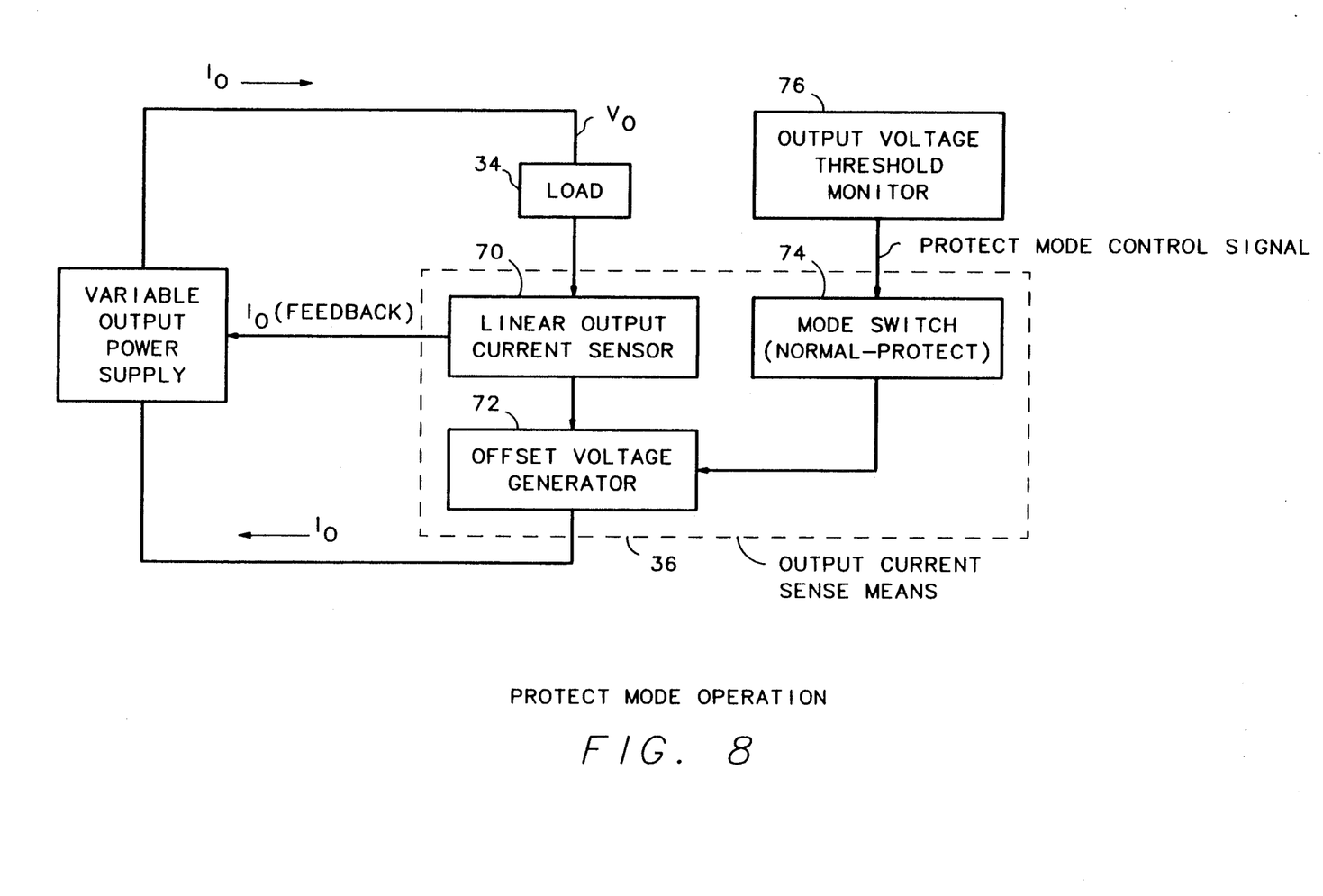
FIG. 8 represents a more detailed block diagram representation of the output current sense means of FIG. 7A which functions to provide a feedback path to control the output of a variable output power supply.

The protect mode operation of a variable output power supply is not limited to the specific circuit elements depicted in FIG. 1 since the protect mode feature of the present invention could be applied to and operated in connection with a wide variety of variable output power supplies which utilize an output current feedback signal to control and maintain a constant output current $I_o$ as illustrated in FIG. 8.

The protect mode operation of the present invention is not limited to either the FIG. 1 or FIG. 6 variable output power supply configurations as would readily be recognized by one of ordinary skill in the power supply design art.

In the FIG. 1 block diagram, output current sense means 36 includes only a linear output current sensor 70 consisting of linear resistors R12 and R13 as illustrated in the FIG. 6 schematic diagram. In the protect mode current limiting embodiment of the present invention as illustrated in FIG. 8, the output current sense means has been expanded to include an offset voltage generator 72 and a mode switch 74. In addition, an output voltage threshold monitor 76 has been provided to generate a protect mode control signal to indicate whether the power supply is operating in a normal mode with an output voltage above a predetermined threshold level or in a protect mode with an output voltage below that threshold level.

Figure 9:
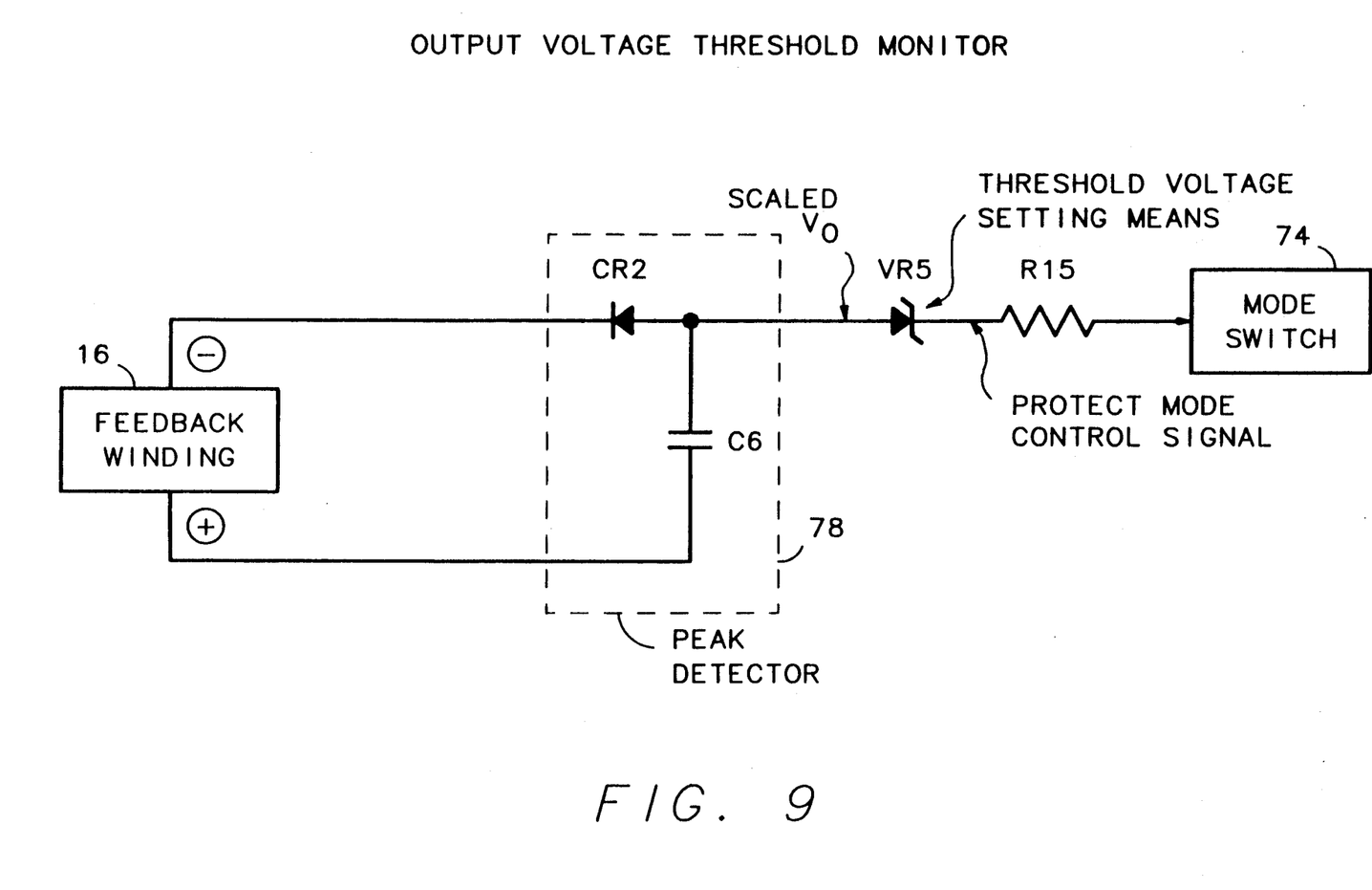
FIG. 9 is a more detailed schematic level representation of the output voltage threshold monitor illustrated in FIG. 8.

FIG. 9 illustrates the preferred embodiment implementation of output voltage threshold monitor 76 as further illustrated in the FIG. 6 schematic diagram.

In the FIG. 6 preferred embodiment of the invention, transformer 12 includes a six turn primary winding, a one hundred and eighty-nine turn secondary winding and a five turn feedback winding. The output voltage threshold monitor of the present invention rectifies and monitors the feedback winding voltage to work with a much safer, lower voltage which equals 5/189 of the typically one thousand volt power supply output voltage $V_o$. By sensing and measuring a scaled version $V_o$, the output voltage threshold monitor 76 can be implemented in the present invention in a less complex, more reliable manner.

The relatively low voltage output of feedback winding 16 is fed to a peak detector 78 (See FIG. 9) consisting of diode 62 and filter capacitor C6 As indicated in FIG. 9, a scaled DC voltage representative of but substantially lower in magnitude than the high voltage output $V_o$ is then transferred to threshold voltage setting means in the form of zener diode VR5. Because of the negative polarity coupling of feedback winding 16 (as indicated by the "+" and "−" symbols illustrated in FIG. 9), zener diode VR5 is coupled as shown to operate properly with the negative polarity voltage from feedback winding 16.

Figures 10, 10C:
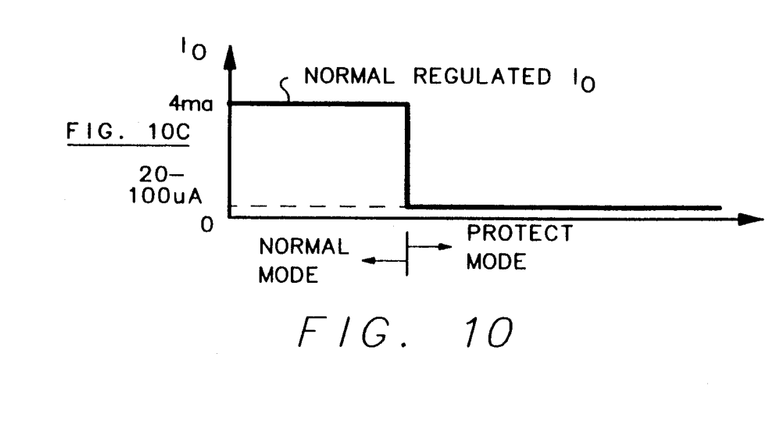
FIG 10C shows the variations in the power supply output current $I_o$ when an unsafe load is substituted for a normal load.
Figure 10A:
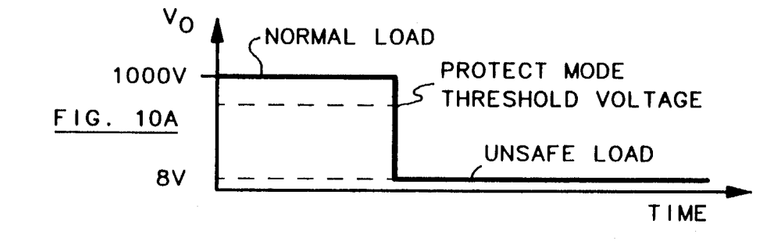
FIG. 10A represents a timing diagram showing variations in the power supply output voltage when the power supply is initially connected to a normal load and is subsequently connected to an unsafe load. The time axis of FIGS. 10B and 10C is synchronized with the time axis of FIG. 10A.
Figure 10B:
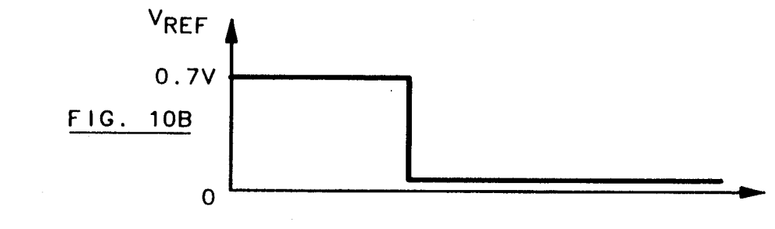
FIG. 10B shows the variations in the reference voltage $V_{ref}$ caused by substituting an unsafe load for a normal load.
Figure 11:
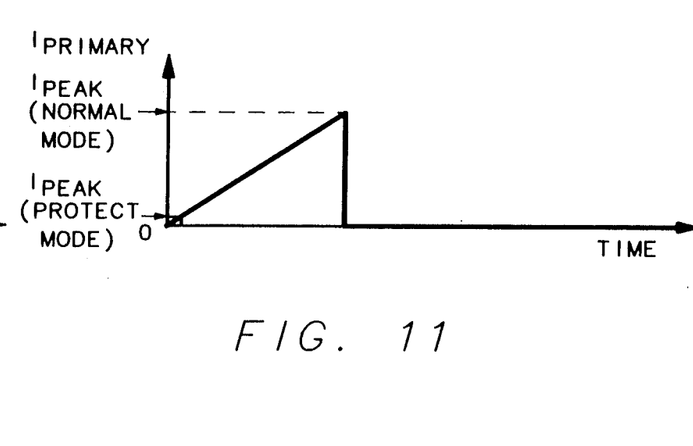
FIG. 11 illustrates the variation in transformer primary winding current versus time and illustrates the peak primary current levels for operation in the normal mode and for operation in the protect mode.

As illustrated by timing diagram FIG. 10A, a "safe" output voltage of one thousand volts corresponds to a normally operating laser tube as illustrated in FIG. 7A and an "unsafe" output voltage of approximately eight volts corresponds to an unacceptable human load as illustrated in FIG. 7B. The protect mode threshold voltage is set at any desirable level between $V_o = 1000$ volts (safe operation) and $V_o = 8$ volts (unsafe operation) to distinguish between these two different power supply operating modes. The protect mode threshold voltage may be conveniently be set to a level between six to eight hundred volts. After considering the proper scaling factor (five turn feedback winding compared to 189 turn secondary winding for the FIG. 9 circuit), an appropriate zener diode can be selected to serve as the threshold voltage setting means VR5.

When the power supply output voltage $V_o$ falls below the selected threshold voltage representing an unsafe condition, a protect mode control signal is communicated to the normally closed mode switch 74 causing it to assume an "open" state and to thereby enter the protect mode of operation.

Figures 12A, 12B:
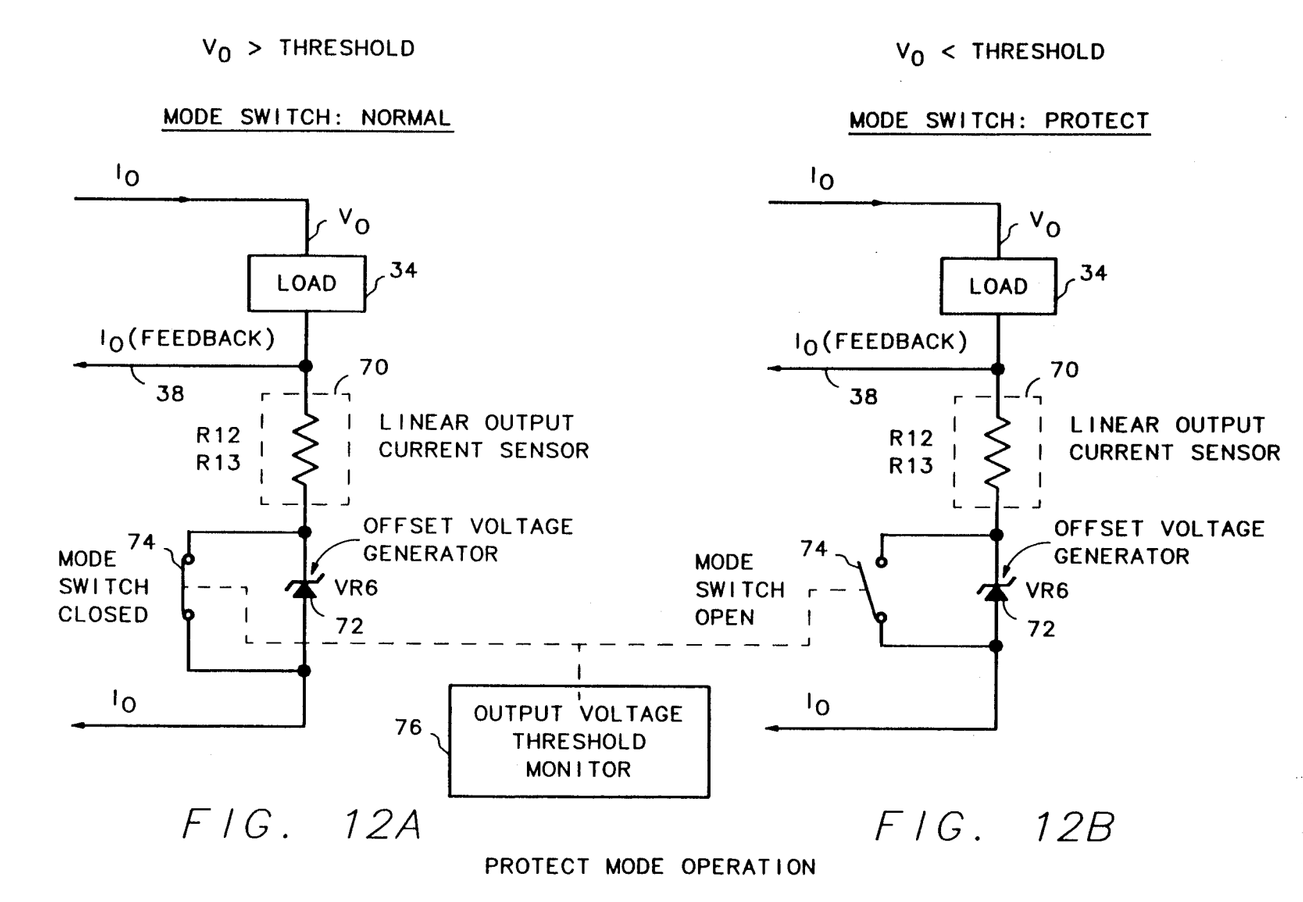
FIG. 12A represents a more detailed illustration of the mode switch, linear output current sensor and offset voltage generator of the output current sense means as illustrated in FIG. 8, showing the mode switch in the "closed" position which eliminates the effect of the offset voltage generator.
FIG. 12B essentially duplicates the FIG. 12A schematic diagram except that the mode switch is shown in the "open" position such that the offset voltage generator modifies the output current feedback signal.

In the FIG. 6 schematic diagram, mode switch 74 corresponds to transistor Q2 and resistors R15 and R16. When operating in the "normal" mode representative of an output voltage greater than the selected threshold voltage, the output voltage of peak detector 78 in the output voltage threshold monitor circuit diagram illustrated in FIG. 9 will cause a current to flow through zener diode VR5 such that the resulting protect mode control signal maintains transistor switch Q2 in the "on" state. As illustrated in FIG. 12A, mode switch Q2 provides a short circuit current flow path around zener diode VR6 which serves as offset voltage generator 72 as illustrated in FIG. 8. In this configuration of the protect mode circuit of the present invention, the variable output power supply operates precisely as described in connection with FIG. 1 since the power supply is operating normally to supply a fixed 4ma output current to a laser tube load 34 resulting with a normal voltage drop (1000 volts) across a normally operating laser tube load 34. That operating condition results in $V_o = 1000$ volts, a voltage level substantially above the selected threshold level (for example a six to eight hundred volt threshold level).

When a human load corresponding to the 2000 Ohm resistor shown in FIG. 7B is placed across the output terminals of the variable output power supply, the output voltage $V_o$ drops to eight volts, a level well below the six to eight hundred volt threshold voltage. The output voltage threshold monitor 76 then sends a different protect mode control signal (e.g., a zero level voltage) to mode switch 74 which turns "off" transistor switch Q2 causing the mode switch to assume the configuration illustrated in FIG. 12B. Offset voltage generator 72 is thus placed in series with the linear output current sensor 70 such that the discrete voltages generated by these two circuit elements are now added together.

In the preferred embodiment of the invention, VR6 is selected as a fifteen volt zener diode. The addition of this substantial offset voltage to the lower magnitude output of the linear output current sensor 70 transfers a very large feedback voltage to the variable output power supply and corresponds to a power supply output current well above the desired regulated output current. The feedback circuit of the variable output power supply drives the power supply output current down to an essentially zero level in an effort to obtain an output current feedback signal corresponding to the desired power supply output current. Since the offset voltage generator 72 is selected to continuously produce a voltage which significantly exceeds a voltage level corresponding to the desired power supply output current, the variable output power supply continues to maintain a near zero level output current.

The operating states and circuit relationships of the protect mode are further summarized in Table 1 below:

TABLE 1

PROTECT MODE OPERATION

| OUTPUT VOLTAGE | MODE | $V_{OFFSET}$ GENERATOR | MODE SWITCH CONFIGURATION | OUTPUT CURRENT |
|---|---|---|---|---|
| $V_0 >$ Threshold | Normal | Out | Closed | Regulated to desired $I_0$ |
| $V_0 <$ Threshold | Protect | In | Open | Limited to Low Level |

The FIG. 10 timing diagrams illustrate the previously described changes in the power supply output voltage, the reference voltage and the power supply output current. The FIG. 11 timing diagram illustrates the manner in which the protect mode circuit of the present invention when operated in combination with the specific FIG. 1 embodiment of the invention causes the programmable reference voltage generator 40 to generate a near zero value of $V_{ref}$ which limits the peak primary current to a near zero level.

As described above, the protect mode feature of the present invention can be readily and inexpensively implemented in the constant current power supply of the present invention as illustrated in the FIG. 1 block diagram and in the FIG. 6 schematic diagram. For the most part, this aspect of the invention may be implemented by using either circuitry existing in the variable output power supply which may simultaneously perform other functions. Alternatively, a limited number of independent circuit elements could be provided to achieve the desired protect mode operation for a variable output power supply.

The variable output power supply of the present invention as illustrated in the FIG. 1 and FIG. 6 diagrams has been implemented with a very limited number of inexpensive component parts enabling it to be manufactured at low cost while still yielding a highly accurate, high voltage constant current power supply for energizing a laser tube. Another direct benefit from utilizing a small number of discrete components is that the power supply of the present invention can be packaged in a housing occupying only a few cubic inches.

The present invention has been described utilizing both block diagram configurations as well as schematic level implementations of various aspects of the present invention to demonstrate the generalized operating concepts of the present invention as well as the functions performed by the discrete circuit elements of the invention. This was done to enhance the understanding of the present invention by those of ordinary skill in the art so that they might readily implement the present invention in other circuit and application embodiments. Such other embodiments may be more complex in nature and may utilize integrated circuits rather than discrete components, but would not depart from the principles and concepts of the invention as explained above. Accordingly, it is intended by the appended claims to cover all such modifications and implementations of the invention which would be apparently to one of ordinary skill in the art and which fall within the true spirit and scope of the invention.

I claim:

1. A power supply for delivering a constant output current to a load comprising:
   a. a coupled inductor including a primary winding, a secondary winding and a feedback winding;
   b. rectifier/filter means coupled to the secondary winding for supplying the load with a DC current;
   c. a power switch having a control lead and first and second switching leads coupled in series with the primary winding for switching between conductive and non-conductive states to control the flow of current through the primary winding;
   d. first drive means for applying a first drive signal to the control lead of the power switch for switching the power switch into the conductive state;
   e. primary current sense means coupled to measure the flow of current through the primary winding and to generate a primary current feedback signal;
   f. output current sense means coupled to monitor the current flow through the load and to generate an output current feedback signal representative of the power supply output current magnitude;
   g. a programmable reference voltage generator for generating a DC reference voltage having a magnitude determined by the output current feedback signal;
   h. power switch control means for comparing the primary current feedback signal with the DC reference voltage and for removing the first drive signal from the power switch control lead when the primary current feedback signal reaches a predetermined level relative to the DC reference voltage to switch the power switch into the non-conductive state; and
   i. second drive means including the feedback winding for applying a second drive signal to the control lead of the power switch for maintaining the power switch in the non-conductive state while energy is being transferred from the secondary winding into the rectifier/filter means.

2. The power supply of claim 1 wherein the power switch control means includes a synthetic thyristor having a gate coupled to receive the primary current feedback signal, an anode coupled to the control lead of the power switch and a cathode coupled to receive the DC reference voltage.

3. The power supply of claim 2 wherein
   a. the synthetic thyristor includes first and second regeneratively coupled bipolar transistors;
   b. the emitter of the first transistor functions as the synthetic thyristor anode;
   c. the base of the second transistor functions as the gate of the synthetic thyristor; and
   d. the emitter of the second transistor functions as the cathode of the synthetic thyristor.

4. The power supply of claim 1 wherein the programmable reference voltage generator includes a current controlled voltage divider for generating the DC reference voltage in response to the output current feedback signal.

5. The power supply of claim 4 wherein the programmable reference voltage generator includes maximum voltage limiting means for restricting the peak value of the DC reference voltage to thereby limit the peak primary winding current.

6. The power supply of claim 4 wherein the current controlled resistor divider includes a current controlled resistor.

7. The power supply of claim 6 wherein
   a the current controlled resistor includes a bipolar transistor; and
   b. the effective resistance across the collector and emitter terminals of the bipolar transistor is inversely proportional to the current through the base-emitter junction of the bipolar transistor.

8. The power supply of claim 4 wherein the power switch control means is coupled to discharge current through the programmable reference voltage generator.

9. The power supply of claim 8 wherein the power switch control means discharges current from the first drive means and from the control lead of the power switch through the programmable reference voltage generator.

10. The power supply of claim 1 wherein the programmable reference voltage generator includes
    a. a current controlled voltage divider for generating the DC reference voltage in response to the output current feedback signal; and
    b. filter means for storing the current discharged from the power switch control lead without substantially changing the DC reference voltage.

11. The power supply of claim 10 wherein the filter means subsequently discharges the stored current through the current controlled voltage divider.

12. The power supply of claims 4 and 6 wherein the programmable reference voltage generator includes filter means for storing the current discharged from the power switch control lead without substantially changing the DC reference voltage.

13. The power supply of claim 12 wherein the filter means subsequently discharges the stored current through the current controlled voltage divider.

14. The power supply of claim 7 wherein the bipolar transistor of the current controlled resistor operates in a linear mode.

15. The power supply of claim 14 wherein the bipolar transistor of the current controlled resistor includes a zener diode coupled in the series with the base terminal of the transistor.

16. The power supply of claims 1 and 4 wherein the primary current sense means includes a resistor coupled in series with the flow of current through the primary winding.

17. The power supply of claim 4 wherein the output current sense means includes a linear output current sensor for generating a linear output voltage representative of the power supply output current.

18. The power supply of claim 5 wherein the maximum voltage limiting means includes a diode.

19. The power supply of claim 10 wherein the filter means includes a capacitor.

20. The power supply of claim 1 further including an output voltage threshold monitor for generating a protect mode control signal to indicate whether the power supply is operating in a normal mode with an output voltage above a predetermined threshold voltage or in a protect mode with an output voltage below the threshold voltage.

21. The power supply of claim 20 wherein the output current sense means includes:
    a. a linear output current sensor for generating a linear output voltage representative of the power supply output current; and
    b. an offset voltage generator coupled in series with the linear output current sensor for selectively generating an offset voltage in response to the protect mode control signal.

22. The power supply of claim 21 wherein the output current sense means includes a mode switch responsive to the protect mode control signal for operating in a normal mode to disable the offset voltage generator and for operating in a protect mode to enable the offset voltage generator.

23. The power supply of claim 22 wherein operation of the mode switch in the protect mode adds the offset voltage to the linear output voltage and causes the reference voltage generator to generate a minimum level DC reference voltage whereby the power supply output current is reduced to a predetermined low level.

24. The power supply of claims 20 and 21 wherein the output voltage threshold monitor is coupled to the feedback winding to detect a scaled voltage related to the power supply output voltage.

25. The power supply of claim 24 wherein the feedback winding generates a pulsed output signal and wherein the output voltage threshold monitor includes means for converting the pulsed output signal from the feedback winding into a DC voltage.

26. The power supply of claim 25 wherein the output voltage threshold monitor includes threshold voltage setting means for receiving the DC voltage from the converting means and for generating the protect mode control signal.

27. The power supply of claim 26 wherein the output current sense means includes:
    a. a linear output current sensor for generating a linear output voltage representative of the power supply output current; and
    b. an offset voltage generator coupled in series with the linear output current sensor for selectively generating an offset voltage in response to the protect mode control signal.

28. The power supply of claim 27 wherein the output current sense means includes a mode switch responsive to the protect mode control signal for operating in a normal mode to disable the offset voltage generator and for operating in a protect mode to enable the offset voltage generator.

29. A power supply for delivering a constant output current to a load comprising:
  a. a coupled inductor including a primary winding, a secondary winding and a feedback winding;
  b. rectifier/filter means coupled to the secondary winding for supplying the load with a DC current;
  c. a power switch having a control lead and first and second switching leads coupled in series with the primary winding for switching between conductive and non-conductive states to control the flow of current through the primary winding;
  d. first drive means for applying a first drive signal to the control lead of the power switch for switching the power switch into the conductive state;
  e. primary current sense means coupled to measure the flow of current through the primary winding and to generate a primary current feedback signal;
  f. second drive means for applying a second drive signal to the control lead of the power switch for maintaining the power switch in the non-conductive state while energy is being transferred from the secondary winding into the rectifier/filter means;
  g. an output voltage threshold monitor for generating a protect mode control signal to indicate whether the power supply is operating in a normal mode with an output voltage above a predetermined threshold voltage or in a protect mode with an output voltage below the threshold voltage; and
  h. output current sense means coupled to monitor the current flow through the load and to generate an output current feedback signal representative of the power supply output current magnitude including
    i. a linear output current sensor for generating a linear output voltage representative of the power supply output current; and
    ii. an offset voltage generator coupled in series with the linear output sensor for selectively generating an offset voltage in response to the protect mode control signal.

30. The power supply of claim 29 wherein the output current sense means includes a mode switch responsive to the protect mode control signal for operating in a normal mode to disable the offset voltage generator and for operating in a protect mode to enable the offset voltage generator.

31. The power supply of claim 30 including:
  a. a programmable reference voltage generator for generating a DC reference voltage having a magnitude determined by the output current feedback signal; and
  b. power switch control means for comparing the primary current feedback signal with the DC reference voltage and for removing the first drive signal from the power switch control lead when the primary current feedback signal reaches a predetermined level relative to the DC reference voltage to switch the power switch into the non-conductive state.

32. The power supply of claim 31 wherein operation of the mode switch in the protect mode adds the offset voltage to the linear output voltage and causes the reference voltage generator to generate a minimum level DC reference voltage whereby the power supply output current is reduced to a predetermined low level.

33. The power supply of claims 31 or 32 wherein the output voltage threshold monitor is coupled to the feedback winding to detect a scaled voltage related to the power supply output voltage.

34. The power supply of claim 21 wherein the second drive means includes the inductor feedback winding, wherein the feedback winding generates a pulsed output signal and wherein the output voltage threshold monitor includes means for converting the pulsed output signal from the feedback winding into a DC voltage.

35. The power supply of claim 34 wherein the output voltage threshold monitor includes threshold voltage setting means for receiving the DC voltage from the converting means and for generating the protect mode control signal.

36. The power supply of claim 35 wherein the output current sense means includes:
  a. a linear output current sensor for generating a linear output voltage representative of the power supply output current; and
  b. an offset voltage generator coupled in series with the linear output current sensor for selectively generating an offset voltage in response to the protect mode control signal.

37. The power supply of claim 36 wherein the output current sense means includes a mode switch responsive to the protect mode control signal for operating in a normal mode to disable the offset voltage generator and for operating in a protect mode to enable the offset voltage generator.

* * * * *